H. M. JACOBS.
EMERGENCY POWER EQUIPMENT FOR ALTERNATING CURRENT SYSTEMS.
APPLICATION FILED SEPT. 17, 1915.
1,297,857.	Patented Mar. 18, 1919.
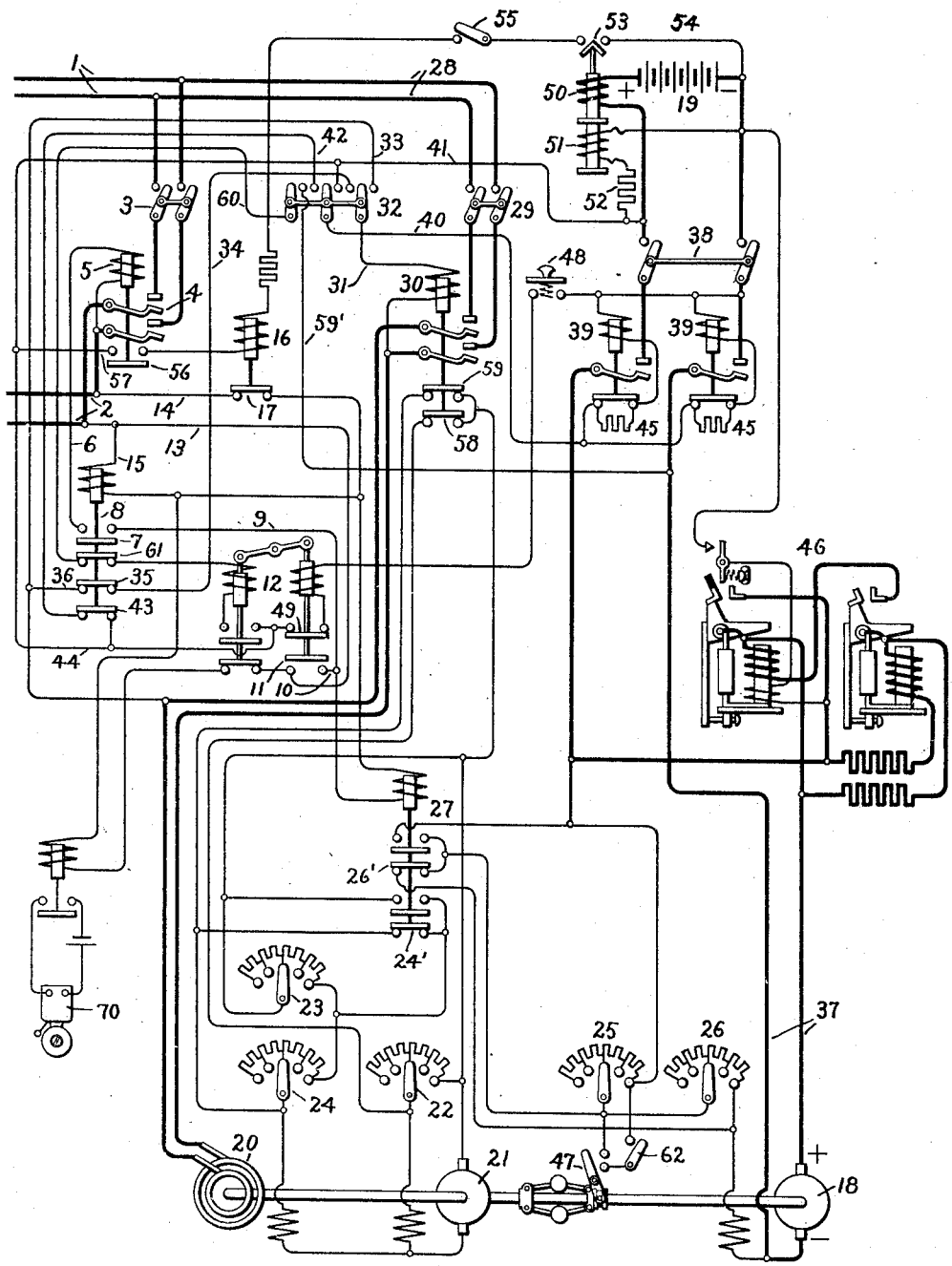
Inventor:
Harry M. Jacobs,
by Albert G. Davis,
His Attorney.

UNITED STATES PATENT OFFICE.

HARRY M. JACOBS, OF SCHENECTADY, NEW YORK, ASSIGNOR TO GENERAL ELECTRIC COMPANY, A CORPORATION OF NEW YORK.

EMERGENCY POWER EQUIPMENT FOR ALTERNATING-CURRENT SYSTEMS.

1,297,857.     Specification of Letters Patent.     Patented Mar. 18, 1919.

Application filed September 17, 1915. Serial No. 51,276.

*To all whom it may concern:*

Be it known that I, HARRY M. JACOBS, a citizen of the United States, residing at Schenectady, county of Schenectady, State of New York, have invented certain new and useful Improvements in Emergency Power Equipment for Alternating-Current Systems, of which the following is a specification.

This invention relates to the supply of power to an alternating current load circuit such as an electric railway signaling system operated by alternating current, particularly at interlockings, and its object is to insure continuity of service at points at which the traffic conditions are such that the failure of the supply of energy to the signal system will give rise to dangerous conditions. In alternating current systems, it is customary to rely for current upon a commercial source of supply, when this is available. But it is possible that this source may be cut off accidentally, and the purpose of my invention is to provide an auxiliary source of current, combined with automatic apparatus for connecting it quickly to the signaling system in case of failure of the commercial current.

To accomplish this, I provide a rotary transformer, or motor generator set, comprising an alternating current generator of sufficient capacity to clear all the signals, a direct current motor for driving the generator, means for exciting the generator, a storage battery for supplying power to the motor and suitable switches, relays and contactors. Under normal conditions, the signal system is supplied from the commercial source of current, and the rest of the apparatus stands idle. But on the failure of the supply, the line contactors open, the motor starts, and when the generator has attained the proper speed, it is connected to the signal system. When the commercial supply returns, the motor is automatically disconnected from the storage battery, and the signal system is disconnected from the generator and reconnected to the commercial lines, thus restoring the normal operation of the plant and shutting down the auxiliary supply apparatus.

When it is desired to charge the storage battery, the generator is positively disconnected from the signal system, the field of the motor is strengthened, and the terminals of said motor are connected to the battery. The motor generator set at once starts, and as soon as the generator voltage and frequency correspond with those of the commercial line, the generator is connected to those lines and will run as a synchronous motor, the direct-current motor now serving as a generator to charge the battery.

Should the commercial supply of current fail while the battery is charging, the battery current will at once begin to drive the direct-current machine as a motor, and the alternating current machine will supply current to the signaling system. But when the commercial supply comes on again, the alternating current machine must be synchronized by hand with the line to which power is supplied from the commercial line; after which the charging of the battery will be automatically resumed.

The accompanying drawing is a diagram of circuits embodying my invention.

Alternating current for the signaling bus bars 1 is taken normally from the commercial supply lines 2, the connection being controlled by a double pole hand switch 3 and a double pole line contactor 4, whose coil 5 is normally connected across the mains 2 by conductor 6, the upper contact disk 7 of a relay 8, conductors 9 and 10, the lower right-hand contact disk 11 of a last position relay 12, which is normally in a position opposite to that shown, and conductor 13. The coil of the relay 8 is energized by current from the commercial line through conductors 14 and 15. At one point in the conductor 14 is a gap which is kept closed by the armature plunger of a shunt trip relay 16. The weight of the plunger keeps the contacts 17 closed so long as the relay is deënergized. It is, therefore, evident that with the relay 8 energized, and the line contactor 4 closed in consequence, the commercial lines 2 can be connected with the signal bus bars by simply closing the hand switch 3.

But in case the current fails on the commercial lines, the direct current machine 18 must be cut in. This machine, as illustrated, is shunt wound and is adapted to operate either as a generator to charge the storage battery 19, or as a motor, taking current from said battery, to drive the alternating current machine 20. This in turn may serve as a synchronous motor to drive the direct-current machine when the battery is to be charged. An exciter 21 for the alternating current machine has its armature mounted on the same shaft as the rotors of the two other machines 18 and 20. The field circuit of the exciter is regulated by a hand rheostat 22. In the exciting circuit of the alternating current machine 20 are two hand rheostats 23, 24, in series. There are two similarly connected rheostats 25, 26 in the field circuit of the direct-current machine 18. The rheostats 24, 26 are preferably arranged in such a manner that they may be easily controlled, while the other two, 23, 25 will not have to be varied after the initial adjustment. Rheostats 25 and 23 are normally short-circuited by the upper and third contact disks respectively on a relay 27, whose coil is in parallel with the coil of the relay 8. When the relay 27 is deënergized, its second and bottom contact disks 26' and 24' will short-circuit the field rheostats 26, 24, respectively, while at the same time the rheostats 23, 25 are cut in. The circuit connections for effecting these results are easily traced. It will be understood that any equivalent construction may be substituted for this relay where the capacity of the apparatus makes such a change desirable.

The connections 28 between the alternating current machine 20 and the signal bus bars are controlled by a double-pole hand switch 29 and a double-pole single coil contactor 30. The coil of this contactor is connected across the leads 28 by means of conductor 31, the right-hand blade of a triple-pole double-throw switch 32, and a conductor 33, when said switch is moved to the right. When it is moved to the left, the circuit from the conductor 31 is continued by conductor 34, the third contact disk 35 of the relay 8, and the conductor 36.

The leads 37 from the direct-current machine 18 can be connected with the terminals of the storage battery 19 by means of a double-pole hand switch 38, two single pole contactors 39, and starting resistances. The coils of these contactors are connected in multiple and are energized from the storage battery when the switch 38 is closed, the circuit being by way of conductor 40 to the middle blade of the switch 32, thence, when the switch is moved to the right, by conductor 41 to the opposite side of the battery circuit. When the switch 32 is moved to the left, the circuit is extended from conductor 40 through conductor 42 to the bottom contact disk 43 of relay 8, and thence by conductor 44 to connect with conductor 41. These contactors 39 are wound to pick up on a moderate voltage (say 85 volts) and a resistance 45 is arranged to be connected in series with each. A disk contact is connected with each contactor in such a manner as to short-circuit the resistance when the contactor is open, and cut it into circuit with the coil when the contactor closes. The resistance is not sufficient to cause the contactor to open even when operating at, say, 85 volts across coil and resistance in series, and the resistance prevents the coils from overheating when the line voltage goes higher.

An automatic starter 46 is connected in series with the battery and motor, comprising one or more resistors and an equal number of series contactors, which operate in the usual manner, holding open on high current and then closing as the current is reduced to cut out the resistance as the motor accelerates. It is thought that a detailed description of this well-known starter is not necessary here.

A centrifugal speed regulating switch 47, here shown diagrammatically, is secured to the motor shaft and is arranged to control the speed by short-circuiting the field rheostat 25. This rheostat 25 for the direct-current machine when it operates as a motor is adjusted to maintain any desired speed. When the motor gets up to approximately one per cent. above normal speed, the normally open switch of the regulator closes and short-circuits the rheostat, thereby reducing the speed until it falls about one per cent. below normal, whereupon the switch opens again. It continues alternately opening and closing, thereby holding the speed between one per cent. above and one per cent. below normal. The changes occur so rapidly that the slight speed variation is not noticeable. This method of regulation is similar to that set forth in the patent to H. A. Laycock, dated June 23, 1914, No. 1,100,748, where a construction is shown which would preferably be employed in practice. A switch 62 is provided in connection with the speed regulator to render the same inoperative when desired.

A push-button switch 48 is connected on one side with the negative lead from the battery, and on the other side with the right-hand coil of the relay 12. The other terminal of this coil is closed by the disk contact 49 on its spindle when the relay occupies the position shown, the circuit then being by conductors 44 and 41 to the positive lead of the battery.

A reverse current relay has a series coil 50 connected in the battery circuit. On the movable core of this coil is a shunt coil 51, connected through a resistance 52 across the battery leads. This core carries a switch contact 53 which controls a circuit 54 from one of the battery leads to a hand switch 55, thence to the coil of the shunt relay 16, thence to a switch 56 controlled by a disk contact connected to the contactor 4, and thence by conductors 57 and 41 to the other battery lead. Two disk contacts 58 and 59 are provided in connection with the alternating-current machine contactor 30, and are arranged so that they will short circuit the rheostats 22, 23 and 24 when the contactor is open, and thereby build up the voltage of the alternating-current machine rapidly when the set is starting, and reduce the time of interruption of power for the alternating-current load circuit to a minimum.

When the triple pole switch 32 is thrown to the right, as during the charging operation, the left-hand blade thereof completes a circuit from the negative side of the direct-current circuit through conductors 59', 60 and the disk contact 61 on the relay 8 to the upper terminal of the left-hand coil on the last position relay 12.

Having described the various elements of the apparatus used, I will now proceed to describe the operation of the equipment as a whole. It has already been stated that when the commercial supply lines 2 are energized, current will flow to the signal bus bars 1 when the switch 3 is closed, because the relay 8, whose coil is across the mains 2, has energized the coil of the line contactor 4.

In order to be ready for a failure of line current, the switches 29 and 38 must be closed, the hand switch 55 open, and the triple pole switch 32 thrown to the left. Now, suppose the line current fails. The relay 8 drops, open-circuiting coil 5 of the line contactor 4. The closing of the bottom disk contact 43 on relay 8 sends battery current through the coils of the contactors 39. Battery current at once flows to the direct-current machine 18, through the resistances of the automatic starter 46, these resistances being short-circuited as the machine speeds up.

As the motor starts, it begins to drive the rotors of the exciter 21 and the alternating-current machine 20. The exciter supplies current to the exciting winding of the machine 20, its field rheostat 22 being short-circuited by the lower disk contact 58 of the contactor 30 as long as the same is deënergized. The field rheostats 23, 24 of the alternating-current machine are short-circuited through the upper disk contact 59 of the contactor 30.

As soon as the voltage generated by the alternating-current machine 20 attains sufficient value, it will pick up the contactor 30, which on closing connects this machine with the signal bus bars. The closing of this contactor opens the disk contacts 58 and 59 thereby cutting the rheostat 22 into the field circuit of the exciter, and the rheostat 23 into the field circuit of the alternating-current machine 20. The rheostat 24 is short-circuited by the bottom disk 24' of the relay 27, whose coil was deënergized, and whose spindle dropped simultaneously with the failure of the commercial line current. The dropping of this relay also short-circuited the field rheostat 26 of the direct-current motor 18 through the second disk contact 26' of said relay. It will now be observed, as was previously described, that when energized and in its raised position this relay short-circuits the field rheostats 23 and 25, while in its deënergized and dropped position it short-circuits the field rheostats 24 and 26. When the set is supplying current to the signaling bus bars, the field rheostats 23 and 25 are the only ones in circuit with their respective machines 20 and 18.

The set will thus continue to supply alternating-current to the signal bus bars during the interruption of the commercial supply. The battery is of sufficient capacity to operate the set under full load for about three hours, which is usually ample time for completing repairs to the commercial line.

Upon resumption of commercial line supply, the control relays 8 and 27 become energized and lift their spindles. This breaks the coil circuit of the contactor 30 at the disk contact 35 of relay 8, and opens the circuit of the alternating-current machine 20. It also opens the coil circuit of the contactors 39 at the disk contact 43 and thereby disconnects the motor 18 from the battery. The contactor 4 is also energized through contact 7 of relay 8, connecting the mains 2 to the signal bus bars 1. The lifting of relay 27 short-circuits the field rheostats 23 and 25 and throws the rheostats 24 and 26 into circuit. The former, however, is short-circuited by the disk contact 59. The field rheostat 22 is also short-circuited by the disk contact 58; so that all the machines come to rest with all the rheostats out of circuit except 26.

In case the storage battery needs charging, the direct-current machine 18 can be run as a generator to supply current to the battery, the alternating-current machine 20 being operated as a synchronous motor to drive the machine 18. To make use of the apparatus in this way, the first thing to do is to see that the hand switch 55 and switch 29 are open and the switch 38 closed. Then throw the triple pole switch 32 to the right. Battery current will now energize and close the contactors 39, the circuit being closed through conductor 40, the middle blade of switch 32, and conductor 41. The direct-current machine 18 at once starts as a motor, driving the alternating-current machine. The rheostat 26 is then adjusted to give the direct-current machine a speed which will develop the frequency of the commercial supply, e. g., sixty cycles, on the alternating-current machine. The alternating current generated by the machine 20 will energize the contactor 30 and open the short-circuiting switches 58 and 59, thereby throwing the rheostats 22, 24 into service. The exciter rheostat 22 is now adjusted for, say, 110 volts direct current, and the alternating-current machine rheostat 24 for 115 volts alternating current. The alternating-current machine is then synchronized with the commercial line current through suitable synchronizing circuits (not shown) by varying the speed of the direct-current machine by means of the rheostat 26, and when the proper moment arrives, the switch 29 is closed. By then strengthening the field of the direct-current machine 18, the alternating-current machine will begin to run as a synchronous motor taking the commercial line current from the signal bus bars. The direct-current machine, now acting as a generator, begins charging the battery, and the charging may be adjusted to the proper value by varying the resistance of the rheostat 26. After the charging current reaches a sufficient value to polarize the reverse current relay, the hand switch 55 must be closed. This is the only time in the operation of this apparatus that this switch is to be closed; at all other times it must be open.

When the battery is being charged, the reverse current relay opens the contact 53 so that the circuit of the shunt relay 16 is still open, even with the switch 55 closed.

Now, suppose that during the process of charging the battery the commercial line current fails. This situation requires that the charging be stopped and set be operated from the battery to drive the alternating current generator so as to supply alternating current to the line. The transfer takes place automatically in the following manner: As the alternating current fails, the direct-current machine ceases to charge the battery, and, instead, acts as a motor driving the alternating-current machine at reduced speed as a generator, and the voltage generated thereby may be sufficiently high to energize the signal bus bars at such a value that relay 8 and coil 5 of contactor 4 will not become deënergized, thus preventing an automatic transfer. This is overcome by the reverse flow of current from the battery to the direct-current machine through coil 50 of the reverse current relay, causing contact switch 53 to close the energizing circuit of shunt relay 16, whose contact 17 opens the coil circuits of relays 8 and 27, thereby opening line contactor 4 and interchanging the field rheostats 24—23 and 26—25. The left-hand coil of relay 12 is energized by battery current through conductor 59', the left-hand blade of triple pole switch 32, conductor 60, the second contact disk 61 on relay 8, the upper left-hand disk on relay 12, and conductors 44, 41. When the relay 12 throws over, the lower left-hand disk closes the circuit to an alarm 70 across the mains 2; the circuit between the right-hand coil and the switch 48 is closed through its upper disk 49; the lower right-hand disk opens the coil circuits of relay 27, thereby throwing rheostats 23 and 25 into circuit, and short-circuiting rheostats 24 and 26. Because of the adjustment of rheostat 25, the battery current reverses and actuates the direct-current machine 18 as a motor, which in turn drives the alternating-current machine as a generator at a voltage for which its rheostat 23 has been adjusted. All these changes take place very quickly, so that the interruption of current on the signal bus bars is only momentary.

Upon resumption of commercial line supply, however, the set must be transferred by hand to a condition of preparedness for another failure. The alarm, whose circuit was previously closed to the dead bus by the lower left-hand disk of relay 12, shows the operator that the line current has come on again. He therefore opens the hand-switch 55, and the switch 62 in the circuit of the centrifugal switch controlling the field rheostat 25. After regulating the speed of the set by manipulating this rheostat by hand, in order to synchronize the set with the line current, he closes the push button 48, which throws the relay 12 to its normal position, restoring all circuits to the condition in which they were for charging the battery previous to the interruption, except that the charging current will be greater on account of the partial depletion of the battery during discharge. The switches 55 and 62 should then be closed, preparatory for another interruption.

It will be observed that the relay 27 always short-circuits one pair of the field rheostats. When energized, it cuts out rheostats 23 and 25, leaving the other two, 24, 26, to govern the charging conditions. When the relay is deënergized, the rheostats 24 and 26 are short-circuited, and rheostats 23 and 25 are cut into the circuit, the latter to govern the speed of the set and the former to govern the voltage of the alternating-current generator when the set is supplying current to the signal bus bars.

The circuit including the shunt trip relay 16, the reverse current relay 50, the hand-switch 55 and disk contact 56 on contactor 4 comes into play when the battery is charging and there occurs a failure of the commercial line current. The reversal of battery current as it starts to actuate the direct-current machine as a motor closes the contacts 53 and energizes the shunt relay 16, causing it to open the contacts 17 and deënergize the relays 8 and 27. This opens the line contactor 4 so that the alternating current from the set cannot feed back into the commercial line. The opening of this contactor breaks the circuit of the relay 16, by disk contact 56 so that the relay coil will not overheat by remaining in circuit during a prolonged interruption.

Briefly summed up, my invention provides for supplying the load circuit, as, for example, a signal system with alternating-current from commercial lines, the motor generator set remaining idle. If the commercial supply fails, the set instantly starts, and furnishes current to the signal system, stopping when the commercial supply resumes. The set can be used to charge the battery by running the alternating-current machine as a motor with current from the commercial supply. If said supply fails while the battery is charging, the set will at once begin to deliver alternating current to the signal system. When the commercial supply resumes, the set can be readjusted by hand to continue the charging operation.

This equipment also has application to any commercial condition using alternating current for motive power where more than a momentary interruption in service would be disastrous.

What I claim as new and desire to secure by Letters Patent of the United States is:—

1. The combination with a load circuit, of a supply circuit normally connected thereto, a storage battery, a rotary transformer, and automatic means operable, upon the failure of supply circuit voltage, to disconnect the load circuit from the supply circuit to connect the storage battery to the rotary transformer to start the same and to connect the rotary transformer to the load circuit to supply current thereto.

2. The combination with a load circuit, of a supply circuit normally connected thereto, a storage battery, a rotary transformer, means for connecting the rotary transformer to the storage battery, automatic means operable, upon the failure of supply circuit voltage, to disconnect the load circuit from the supply circuit and to connect the rotary transformer to the load circuit to supply current thereto, and automatic means for maintaining the speed of the rotary transformer substantially constant.

3. The combination with a load circuit, of a supply circuit normally connected thereto, a storage battery, a rotary transformer, and automatic means operable, upon the failure of supply circuit voltage, to disconnect the load circuit from the supply circuit and to connect the rotary transformer to the storage battery, whereupon the rotary transformer is started and operated from the storage battery, and subsequently to connect the rotary transformer to the load circuit to supply current thereto.

4. The combination with a load circuit, of a supply circuit normally connected thereto, a storage battery, a rotary transformer, automatic means operable, upon the failure of supply circuit voltage, to disconnect the load circuit from the supply circuit and to connect the rotary transformer to the storage battery, whereupon the rotary transformer is started and operated from the storage battery, and subsequently to connect the rotary transformer to the load circuit to supply current thereto, and automatic means to maintain the speed of the rotary transformer substantially constant.

5. The combination with a load circuit, of a supply circuit normally connected thereto, a storage battery, a rotary transformer, and automatic means operable, upon the failure of supply circuit voltage, to disconnect the load circuit from the supply circuit and to connect the rotary transformer to the storage battery, whereupon the rotary transformer is started and operated from the storage battery, and subsequently to connect the rotary transformer to the load circuit to supply current thereto, and operable, upon the restoration of supply circuit voltage, to disconnect the rotary transformer from the load circuit and the storage battery and to connect the load circuit to the supply circuit.

6. The combination with a load circuit, of a supply circuit normally connected thereto, a storage battery, a rotary transformer, means for electrically connecting the rotary transformer between said load circuit and the storage battery and causing the rotary transformer to be operated from the load circuit to charge the battery, and automatic means operable, upon the failure of supply circuit voltage, to disconnect the load circuit from the supply circuit and to cause the rotary transformer to be operated from the storage battery to supply current to the load circuit.

7. The combination with a load circuit, of a supply circuit normally connected thereto, a storage battery, a rotary transformer, means for electrically connecting the rotary transformer between said load circuit and the storage battery and causing the rotary transformer to be operated from the load circuit to charge the battery, automatic means operable, upon the failure of supply circuit voltage, to disconnect the load circuit from the supply circuit and to cause the rotary transformer to be operated from the storage battery to supply current to the load circuit, and means to prevent connection of the load circuit to the supply circuit upon a restoration of supply circuit voltage.

8. The combination with an alternating current system, of a supply circuit therefor, a normally idle motor-generator set, a storage battery, means for starting the set automatically to supply alternating current when the current in the supply circuit fails, means whereby said set can be used to charge the storage battery while there is current available in the supply circuit, and means for automatically causing the set to supply alternating current to the said alternating current system in case the current in the supply circuit fails while the battery is charging.

9. The combination with a load circuit, of a supply circuit normally connected thereto, a storage battery, a rotary transformer, automatic means operable, upon the failure of supply circuit voltage, to disconnect the load circuit from the supply circuit and to connect the rotary transformer to the storage battery, whereupon the rotary transformer is started and operated from the storage battery, and subsequently to connect the rotary transformer to the load circuit to supply current thereto, and operable, upon a restoration of supply circuit voltage, to disconnect the rotary transformer from the load circuit and the storage battery and to connect the load circuit to the supply circuit, means for electrically connecting the rotary transformer between said load circuit and storage battery and causing the rotary transformer to be operated from the load circuit to charge the battery, and automatic means operable, upon the failure of supply circuit voltage while the battery is being charged, to cause the load circuit to be disconnected from the supply circuit and the rotary transformer to be operated from the storage battery to supply current to the load circuit.

10. The combination with the load circuit, of a supply circuit normally connected thereto, a storage battery, a rotary transformer, automatic means operable, upon the failure of supply circuit voltage, to disconnect the load circuit from the supply circuit and to connect the rotary transformer to the storage battery, whereupon the rotary transformer is started and operated from the storage battery, and subsequently to connect the rotary transformer to the load circuit to supply current thereto, and operable, upon a restoration of supply circuit voltage, to disconnect the rotary transformer from the load circuit and the storage battery and to connect the load circuit to the supply circuit, means for electrically connecting the rotary transformer between said load circuit and storage battery and causing the rotary transformer to be operated from the load circuit to charge the battery, and automatic means, operable, upon the failure of supply circuit voltage, while the battery is being charged, to cause the load circuit to be disconnected from the supply circuit and the rotary transformer to be operated from the storage battery to supply current to the load circuit, and means to prevent the operation of the first named automatic means, to connect the load circuit to the supply circuit, upon the restoration of the supply circuit voltage.

11. The combination with an alternating current load circuit, of a supply circuit therefor, a normally idle motor-generator set, a storage battery, two pairs of field rheostats, each pair in series, respectively, with the fields of the direct-current machine and the alternating-current machine of the set, a relay connected across the supply circuit for short-circuiting one rheostat of each pair when the set is supplying current to the load circuit, and the other rheostat of each pair when the set is charging the storage battery, and a secondary relay for reversing the position of the aforesaid relay when the supply fails during the charging operation.

12. The combination with an alternating current system, of a motor-generator set, a storage battery, contactors controlling the connection of the set with the battery and the alternating current system, a circuit for the direct-current machine contactor, a circuit for the alternating-current machine contactor, and a switch controlling both circuits simultaneously.

13. The combination with an alternating current load circuit and an alternating-current supply line, of a motor-generator set, a storage battery, contactors controlling the connection of the set with the battery and the load circuit, a circuit for the direct-current machine contactor, a circuit for the alternating-current machine contactor, an alternating-current relay connected across the supply line, and a double-throw switch controlling the circuits of both contactor coils simultaneously, and closing them directly when in one position, and through contacts on the relay when in the reverse position.

14. The combination with an alternating-current load circuit and an alternating-current supply line, of a contactor controlling the connection between them, a relay connected across said line and controlling said contactor, a motor-generator set for supplying current to the load circuit when the supply fails, a storage battery, means for charging it from the set, and a control circuit when the battery is charging comprising a shunt trip relay in the circuit of the line contactor relay, a switch controlled by said contactor, a hand switch, and a reverse current relay in the battery circuit.

15. The combination with an alternating-current load circuit and an alternating-current supply line, of a contactor controlling the connection between them, a relay connected across said line controlling said contactor, a motor-generator set for supplying current to the load circuit when the supply fails, a storage battery, means for charging it from the set, and means responsive to the flow of power between said supply line and said battery controlling the circuit to the line contactor relay.

16. In combination, an alternating-current circuit, a direct-current source, a motor-generator set, means for connecting one of the machines of said set to said alternating-current circuit, means for automatically starting said set from the direct-current source, and means responsive to the operation of said alternating-current connecting means for increasing the excitation of the alternating-current machine when said connecting means is open.

In witness whereof I have hereunto set my hand this 16th day of September, 1915.

HARRY M. JACOBS.

Copies of this patent may be obtained for five cents each, by addressing the "Commissioner of Patents, Washington, D. C."